Sept. 6, 1966 D. VON SANDEN ETAL 3,271,521

CIRCUIT ARRANGEMENT FOR ASCERTAINING OPERATING CONDITIONS OF SUBSCRIBER STATIONS OF A TIME MULTIPLEX COMMUNICATION SYSTEM

Filed May 8, 1961

4 Sheets-Sheet 1

Inventors.
Dieter von Sanden,
Hubert Suckfüll, &
Allan Darre.

By [signature] Atty.

Inventors.
Dieter von Sanden,
Hubert Suckfüll, &
Allan Darre'.
By [signature] Atty.

Inventors.
Dieter von Sanden,
Hubert Suckfüll, &
Alfan Darre'.

By. [signature] Atty.

Inventors.
Dieter von Sanden,
Hubert Suckfüll, &
Alfan Darré.
By. [signature] Att'y 3,271,521

CIRCUIT ARRANGEMENT FOR ASCERTAINING OPERATING CONDITIONS OF SUBSCRIBER STATIONS OF A TIME MULTIPLEX COMMUNICATION SYSTEM

Dieter von Sanden, Munich-Solln, Hubert Suckfüll, Munich-Obermenzing, and Allan Darré, Munich, Germany, assignors to Siemens & Halske Aktiengesellschaft Berlin and Munich, a corporation of Germany Filed May 8, 1961, Ser. No. 108,330
Claims priority, application Germany, June 10, 1960, S 68,878
23 Claims. (Cl. 179—15)

This invention is concerned with an electronic communication system, for example, a telephone system, operating in accordance with the time multiplex principle.

In such a system, the messages to be transmitted are modulated upon pulse sequences which are mutually displaced, thus permitting plural utilization of transmission channels. These pulse sequences, hereinafter referred to as control pulses, are in many communication systems individually assigned to subscribers while they are in some other systems allocated to established connections. The present invention is concerned with communication systems of the latter type which distinguish basically from other systems, by the characteristic allocation of the control pulses to established connections, and which are accordingly entirely differently constituted insofar as the arrangement of the various control devices is concerned.

Known systems of the type which are pertinent in connection with the present invention are substantially constructed as follows:

A predetermined number of subscribers are interconnected with a so-called multiplex juncture point, by means of electronic call switches respectively assigned thereto, over which the calls are established. The mutually displaced pulse sequences, that is, phase shifted control pulses, effect simultaneous opening of only those call switches which are assigned to subscribers who are to be interconnected for communication purposes. For the control of the call switches, there are provided two cyclic storers for storing, in coded form, the addresses of the subscribers, separately as to outgoing and incoming calls. The addresses (in the form of symbols which are respectively assigned to each individual subscriber) of subscribers who are interconnected for mutual communication, appear at the outputs of the cyclic storers simultaneously impulsewise and are repeated with the pulse sequence frequency, thus cyclically circulating in the cyclic storers with predetermined pulse phases. They are extended from the cyclic storers to devices, referred to as decoders, which evaluate these addresses for the purpose of making conductive the call switches which are assigned to the respective subscribers. Two-wire connection channels extending between communicating subscribers are in this manner maintained. However, these connection channels must first be established and subsequently disconnected again. The storing of the addresses of a calling and of a called subscriber or station, in the cyclic storers, constitutes the prerequirement for establishing a connection. The communication systems of the type which is herein considered, apply different measures for the solution of the problems involved.

For example, in order to encompass called subscribers, there were provided particular identification networks which are in part read out impulsewise. It was thus proposed (Ericson Review 1956/1), a Swedish publication, to provide for this purpose an identification matrix subdivided into columns and rows and to read out such matrix columnwise and row-wise with the aid of pulses so as to ascertain calling subscribers. The pulses applied for this purpose must be interlaced in predetermined manner and therefore have nothing in common with the control pulses employed for the operation of the call switches.

The present invention proposes another way for carrying out the identification, making it possible to additionally use for this purpose devices which are present as a matter of course, and thus also permitting to supervise established connections in simple manner. Moreover, the invention makes it possible to obtain in simple manner criteria for use in effecting control operations to be carried out in the communication system.

The present invention is thus concerned with a communication system in which two-wire connections are throughout established according to the time multiplex principle, and wherein the individual subscribers can be connected to a call multiplex point over electronic call switches which are controlled by mutually phase shifted control pulses produced by means of the addresses of the subscribers participating in the respective calls, such pulses being respectively assigned to connections established thereby. In accordance with the characteristic features of this system, all subscriber line circuits are successively tested as to the operating condition thereof, that is, whether they are busy or idle, which is effected with the aid of inserting in the cycle of the control pulses a reading pulse with the same impulse sequence frequency, and extending the criteria thereby appearing in the subscriber line circuits, directly to a central control device which evaluates an incoming criterion after comparison of the address of the respectively assigned read out subscriber with the addresses of subscribers participating in established connections.

It may be noted at this point that it is already known (The Bell System Technical Journal, January 1960, pages 31–57) to test subscriber lines which are connected with devices for time multiplex operation and communicatively interconnected over two-wire circuits, with the aid of a reading pulse especially provided therefor. The devices concerned in such case extend connections outgoing from a group of subscribers to an exchange from which incoming connections are extended to these subscribers. Connections between subscribers belonging to such group cannot be established within these devices as such. Accordingly, there is concerned a selection stage which corresponds approximately to a conventional selection stage with two-way operation switches. As contrasted with this situation, the present invention is concerned with a communication system which as such carries out all necessary functions.

The exchange delivers to the referred to selection stage, in the course of a reading pulse, the addresses of subscribers which are not involved in conversation. These subscribers (stations) are thereupon tested to ascertain whether the receivers are on or off. Accordingly, only a given part of the subscribers connected to the selection stage is tested in the course of the reading pulse. Therefore, before delivering addresses, those subscriber stations must be ascertained in the exchange, which are not engaged in calls. Moreover, addresses to be delivered must first be compared in the exchange with addresses of the subscriber stations which are already involved in calls.

As compared with this situation, the communication system according to the present invention provides for successively reading, in the course of the reading pulse, all subscribers without any distinction. Particular comparison operations prior to the reading are therefore avoided. When the reading result is available, the obtained reading criteria are extended to the central control device for evaluation. In the evaluation, there is required information, among other, as to whether the involved subscribers are calling or called subscribers. This information is likewise obtained with the aid of an address comparison, that is, a comparison of the addresses of the read-out subscribers with the addresses of the subscribers who are already involved in conversation. However, this address comparison does not merely serve for separating particular subscribers for reading out purpose, but for obtaining information which determines the required control commands for building up a connection, etc. An address comparison merely for sorting subscribers for reading out purposes, is eliminated.

Since all subscribers are, in acordance with the invention, read, such reading also encompasses the release of connections. As compared therewith, the release of connections is in the known selection stage not encompassed with the aid of the inserted reading pulse, since subscribers engaged in conversation are not read by such pulse. Accordingly, special measures must be provided for this purpose. Such special measures are avoided by the present invention since subscribers engaged in conversation are also read incident to a reading pulse. The central control device, in conjunction with the reading, therefore can deliver all control commands required respectively for the building up and for the release of connections.

Accordingly, the present invention distinguishes from the known arrangement, which merely represents a selection stage, in being concerned with a complete communication system which is adapted to execute all required functions. A further distinction resides in executing the reading in a different manner. Operations which would otherwise be required are thereby avoided, for example, the previously mentioned comparison of addresses prior to the reading. Moreover, the obtained reading criteria are in the system according to the invention directly extended to the central control device. In the known arrangement, the criteria are transmitted over the speech channel for evaluation in the exchange, thus requiring particular operations for inserting these criteria between other signals which are being transmitted over the respective speech channel. Moreover, further particular operations are required in the exchange for separating the various signals arriving over the speech channel, so as to conduct such signals to the connecting devices for which they are intended. The present invention makes all these operations superfluous.

The various objects and features of the invention will be brought out in the course of the description which is rendered below with reference to the accompanying drawings.

FIG. 1 shows in schematic manner an example of a time multiplex telephone system with the connecting devices which have a bearing on the understanding of the invention;

FIG. 2 indicates the manner in which the reading pulse is inserted in the cycle of the control pulses;

The structure and mode of operation of the communication system shown in FIG. 1 will be discussed first so as to furnish a basis for the understanding of the scope and importance of the present invention.

The subscriber stations T*n*1 . . . T*nx* are connected with call multiplex point SM over line circuits T*s*1 . . . T*sx* and call switches S1 . . . S*x*. The call switches of subscribers who are interconnected are made conductive in the rhythm of the control pulses belonging to the respective connections.

Figure 1:
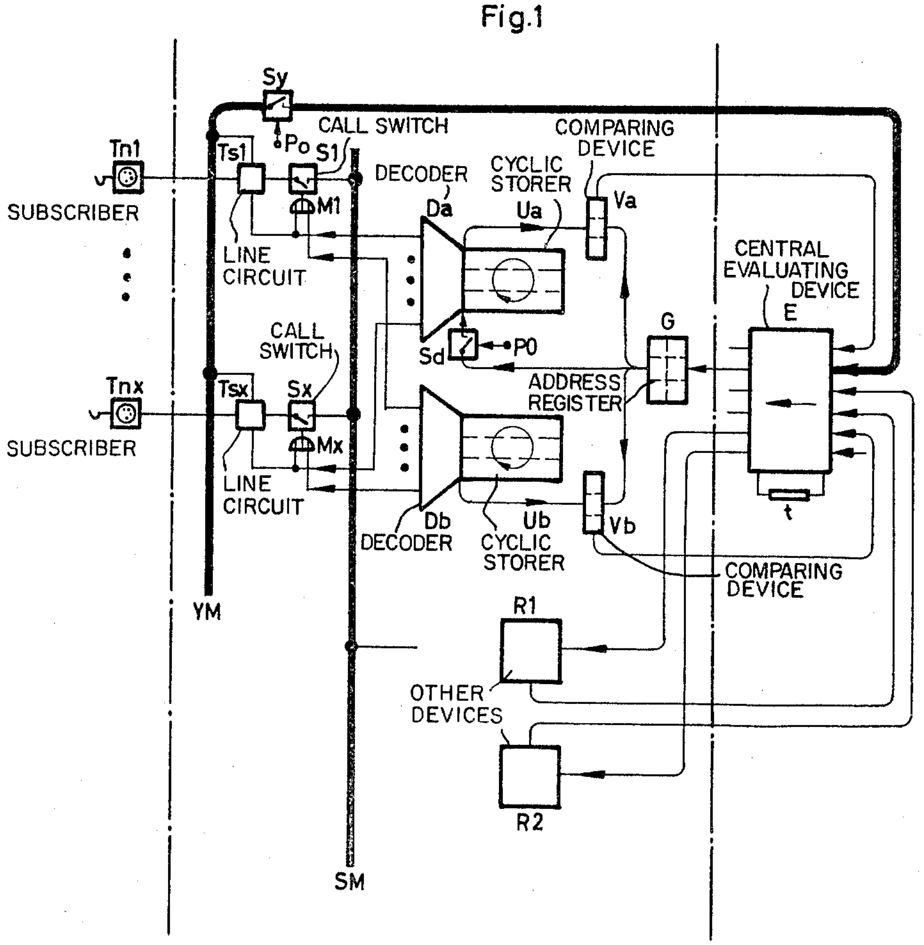
Figure 2:
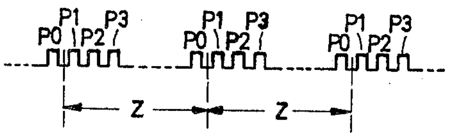

FIG. 2 shows the control pulses. The pulses P1 belong to a first control pulse sequence, the pulses P2 to a second control pulse sequence, and so forth. The pulses of the different control pulse sequences have the same pulse sequence frequency. The various control pulses are included in cycles *z*, in the course of which appears first a pulse of the first pulse sequence. In the communication system represented in FIG. 1, the various control pulses are delivered at the outputs of the decoders D*a* and D*b* which supply the respective individual call switches S1 . . . S*x* with control pulses of predetermined phase position, so as to establish connection between the subscribers involved. These decoders will be presently described more in detail. Each call switch S1 . . . S*x* is connected with an output of the decoder D*a* and also with an output of the decoder D*b*. The triggering of the call switches is effected over Or-gates M1 . . . M*x* respectively cooperating therewith, such gates serving for the decoupling.

In the cycle of the control pulses is inserted a special reading pulse which has the same pulse sequence frequency, such reading pulse serving for the reading of the subscriber loops. This reading pulse, designated by P0 is inserted in the respective cycles of the control pulses P1, P2 . . . , shown in FIG. 2, as a pulse with its own phase position. The phase shifting thus resulting between the reading pulse P0 and the control pulses P1, P2 . . . prevents mutual interference between the various functions to be executed by the subscriber line circuits and the call switches, despite the fact that the call switches S1 . . . S*x* and the subscriber line circuits T*s*1 . . . T*sx* are connected to identical outputs of the decoder D*a*. The use of a reading pulse with the pulse sequence frequency of the control pulses makes it possible to utilize for the reading devices, in the present case, the decoder D*a*, which is also provided for executing different functions. In the example under consideration, the pulses P0 of the reading pulse sequence are for this purpose delivered by the decoder D*a*. The subscriber line circuits T*s*1 . . . T*sx* are connected to the outputs of the decoder D*a* for distributing thereto the individual reading pulses P0. Accordingly, the decoder D*a* is not only utilized for the control of the call switches S1 . . . S*x* but also for the reading of the subscriber line circuits T*s*1 . . . T*sx*.

The reading pulses P0 extended to the subscriber line circuits T*s*1 . . . T*sx* cause appearance, at the line circuits, of different criteria, depending upon the operating conditions of the respective subscriber stations, that is, whether the receiver at such station is on or off. These criteria may, for example, consist in giving off a pulse in one case while failing to give off a pulse in the other case. The criterion may also consist in extending the reading pulse further or in suppressing such pulse.

The criteria appearing in the subscriber line circuits are directly extended to the central evaluation device E for evaluation therein. A supervising multiplex line YM, which is common to all subscriber line circuits is suitably used for this purpose. The subscriber line circuits T*s*1 . . . T*sx* are accordingly connected to the supervising multiplex line YM which extends to the control device E. The criteria delivered by the various subscriber line circuits appear on this line successively, thereby avoiding mutual interference. They can thus be processed successively in the control device E.

As already mentioned, the pulses P0 of the reading pulse sequence are distributed with respect to the various subscribers by means of the same device as the control pulses P1, P2 . . . . The cyclic storers U*a* and U*b*, to which are connected the decoders D*a* and D*b*, serve for the distribution of the control pulses. The addresses of subscribers which are involved in calls in outgoing direction, which will be presently explained more in detail, are cyclically repeated in the cyclic storer U*a* with a predetermined speed. The cyclic storer has accordingly outputs at which the addresses appear periodically with the sequence frequency of the pulses of the control pulse sequence. To these outputs is connected the decoder D*a*. Since the individual control pulses are mutual phase shifted, only one address is at any instant extended to the decoder D*a*. The decoder D*a* has a number of outputs which are respectively assigned each to a subscriber; there are accordingly as many outputs as there are subscribers in the group involved. When the address of a subscriber is extended to the decoder, there will appear a pulse at the output which is allocated to such subscriber. This pulse is extended to the respectively associated call switch and serves for the control thereof. The result is that the respective subscriber is for the duration of the pulse connected with the call multiplex point SM.

There is in addition provided a cyclic storer U*b* in which are cycled the addresses of subscriber stations which are involved in incoming calls. The addresses of stations belonging to one and the same call are cycled in the two cyclic storers U*a* and U*b* with identical phase. To the cyclic storer U*b* is connected the decoder D*b* which is constructed exactly as the decoder D*a*, and the outputs of which are connected in the same manner with the call switches S1 . . . S*x* which belong to the respective subscriber stations. In order to prevent a reaction between the decoders, they are connected with the call switches by means of the Or-gates M1 . . . M*x*. The addresses of the two subscriber stations involved in a call appear simultaneously at the inputs of the respective decoders D*a* and D*b* which are now operative to make the two involved call switches simultaneously conductive, thereby effecting the impulse-wise switching through of the corresponding call.

The decoder D*a* is in this case utilized for distributing the reading pulses to the subscribers of the communication system. To the decoder are for this purpose cyclically conducted the addresses of all subscribers, during the intervals of action of the reading pulses. Since the reading pulse is displaced as to time with respect to the control pulses, the function of the decoder D*a* is thereby not disturbed. Accordingly, reading pulses will successively appear at all outputs of the decoder, which are to be extended to the subscriber line circuits T*sl* . . . T*sx* which are connected with these outputs. The respective subscriber line circuits T*sl* . . . T*sx* also reecive the control pulses supplied by the decoder D*a* for the extension of calls, the subcriber line circuits thus delivering reading criteria for the duration of the control pulses.

It is now possible to utilize for the evaluation only the criteria delivered by the subscriber line circuits during the reading pulse. This is accomplished by inserting into the common multiplex transmission line a switch which is controlled by the reading pulse P0, so that this line is switched through synchronously with such pulse. This switch is designated in FIG. 1 by S*y*. Accordingly, the reading criteria effected by the control pulses will not reach the control device E. It may also be mentioned that the call switches S*l* . . . S*x* receive, in the illustrated circuit, in addition to the control pulses, also the reading pulse delivered by the decoder D*a*. However, since the corresponding pulses are extended only to one of the call switches, there will not result a disturbing effect and, therefore, no undesired connection will be established.

In order to enable the decoder D*a* to deliver in addition to the control pulses also the reading pulse, it is necessary to extend thereto cyclically successively, within the duration of the reading pulse, the addresses of the subscriber stations to be read. For the delivery of the addresses, there is in this case provided an address register G. In this address register appear successively the various addresses, in the form of a pulse code, wherein of a plurality of lines, a predetermined combination is always impulse-wise marked. To each subscriber is thereby allotted an individual combination. The circuiting details concerning this principle will be explained presently with reference to FIG. 3. The addresses are obtained from a counting chain which is stepped along by one step at the termination of at least one cycle of the control pulses, when the next address appears. Upon reaching its terminal position, the counting chain is restored to its initial position. The subscriber addresses are thus present in the address register always for at least the length of a cycle of the control pulses. The outputs of the address register G are connected with the decoder D*a*, a switch S*d* being disposed in the corresponding connecting line, which is controlled by the reading pulse P0, thus conducting to the decoder D*a* an address always exactly at the required instant. The stepping along of the counting chain is delayed, if required, in case it is found upon reading a subscriber, that particularly complicated control operations are required. The counting chain is in such case stepped along after termination of more than one cycle of the control pulses.

In accordance with the present invention, the subscriber stations are regularly read as to the operating condition thereof, in accordance with the reading pulses. The pulse sequence frequency of the reading pulses is equal to that of the control pulses. The pulse sequence frequency of the control pulses is not selectible as desired, but must correspond, as is known, to a predetermined minimum value which depends upon the highest speech frequency to be transmitted. The pulse sequence frequency must in fact be twice as high as the highest speech frequency to be transmitted. Accordingly, for practical operation, the pulse sequence frequency must amount to about 8 to 10 kilocycles. The spacing as to time, at which a subscriber station is repeatedly read, depends upon this pulse sequence frequency and upon the number of subscriber stations.

If the pulse sequence frequency is, for example, 10 kilocycles, and if there are 1000 subscribers, each subscriber will be read ten times per second. This reading sequence is sufficiently rapid to recognize (ascertain) in time changes in the operating conditions of the subscriber stations. The reading is effected sufficiently frequently even if interruptions should occur owing to the execution of control operations in the reading sequence due to non-use of individual reading pulses. The regular reading is effected with respect to all subscribers, whereby those subscribers who have just removed the receiver, are identified in a manner to be presently explained, such identification taking place sufficiently quickly due to the rapidity of the reading sequence. However, other control operations, having to do with the building up of calls and with the release thereof, depend upon and are effected by the reading results. The reading of the subscriber stations, as proposed by the invention, therefore satisfies in advantageous manner a plurality of necessary functions.

In order to determine, depending upon the reading result, whether there is to be executed a control operation for evaluating the reading result, there may be applied, in the herein described communication system as well as in differently constructed communication systems, the following procedure. It is merely required that there is provided a cyclic storer for the addresses of subscribers in outgoing and incoming connections, respectively. This will make it possible to determine during the cycling of the addresses in the cyclic storers, the control operations to be effected, by a comparison of the address of the subscriber being read, with the addresses entered in the two cyclic storers under consideration of the operating condition of the corresponding subscriber as ascertained by the reading. The address of the respective subscriber station which is being read is in the herein described communication system available in the address register G at least for the time of an address cycle (time Z, see FIG. 2), and the noted comparison is therefore evidently possible. Special comparing devices may be employed for this purpose, to which are conducted the addresses to be compared, such devices delivering special signals in accordance with the respective comparison result. These signals can then be conducted to the control device E, which also receives the reading criteria obtained in the reading of the subscriber loops, and in which is effected the evaluation of the received signals and criteria. If desired, the required control operations are thereupon effected under the control of the control device. In the circuit shown in FIG. 1, the comparing devices are indicated at V*a* and V*b*. To the comparing device V*a* are conducted the respective address presented by the address register G and the addresses appearing during the corresponding address cycling at the outputs of the cyclic storer U*a*. Upon ascertaining address coincidence, the comparison device V*a* will extend a signal to the control device E. Addresses are in similar manner extended to the comparison device V*b*, from the cyclic storer U*b* and the address register G. for extending in the case of coincidence, a signal to the control device E.

Different operating conditions will be present depending upon whether the address of the read subscriber is entered in none, in one or in both cyclic storers, and whether the read subscriber's receiver is on or off. These different operating conditions will now be described.

No control operation is to be released if the read subscriber's receiver is on (replaced) and if his address is not entered in any of the cyclic storers. Such a subscriber is neither involved in an established call nor is he about to initiate a call. Accordingly, such operating condition does not require a control operation.

However, if the read subscriber has removed the receiver, and if his address is not entered in any cyclic storer, it is the case of a subscriber who desires a connection. The following control operations must now be effected: In order to recognize this condition, the address of the corresponding subscriber must be entered incident to the next free pulse phase, that is, at a pulse phase which is not yet allocated to a call, in the cyclic storer U*a* for subscriber engaged in outgoing calls. In such case, the stepping of the addresses in the address register must be discontinued for the time being. The address present in the register can then be transmitted to the cyclic storer U*a* at the proper instant. The address register can thereafter be stepped further and the next subscriber can thereupon be read. Moreover, a device (not shown in FIG. 1) is to be allotted to the previously read subscriber, for receiving the selection information, since it is to be expected that such subscriber will soon demand extension of a call.

In case it is upon reading of a subscriber station ascertained that the receiver has been removed and that the corresponding address has been entered only in the cyclic storer for subscribers engaged in outgoing calls, that is, that there is in the same phase no address in the cyclic storer for subscribers engaged in incoming calls, it must be the case of a subscriber whose address has been just entered in the cyclic storer for outgoing calls, as previously described, and that the subscriber is about to give his selection information, for the reception of which a device had been allotted to him. The reception of the selection information has nothing to do with the reading. Accordingly, no particular control operation is to be released based upon the comparison.

If it is upon reading a subscriber station ascertained that the receiver is replaced and that the corresponding address has been entered in the cyclic storer for subscribers engaged in outgoing calls, it is the case of a subscriber who had been a party to a call before and who had replaced the receiver, that is, who had completed the call. In such case, the existing connection has to be released and the corresponding pulse phase has to be freed. Moreover, the addresses entered in the cyclic storer with this pulse phase, have to be cancelled. The cancellation of the address of the read subscriber, which is contained in the cyclic storer U*a*, can be cancelled, for example, with the aid of the address register G and the comparison device V*b*, the latter yielding information, incident to the next cycling of the addresses, as to the appearance of the address to be cancelled, at the outputs of the cyclic storer U*a*, such address corresponding to one which is also contained in the address register. The entered address is to be cancelled at that instant. In addition, the address entered for the same pulse phase in the cyclic storer U*b*, for subscribers involved in incoming calls, must also be cancelled. The control of these operations is effected with the aid of the control device E.

No control operation is effected, based upon the comparison, when the read subscriber has replaced his receiver while his address is contained in the cyclic storer for subscribers in incoming calls. It may be the case of a subscriber who had just completed his call and replaced his receiver. No control operation is to be effected in such a case if it is desired that the connection should be released responsive to replacement of the receiver of the participating subscriber who had been involved in an incoming call. The case may also be one of a subscriber to which a connection is to be extended. Assuming that such subscriber already receives the ringing signal, control operation must be deferred until the involved subscriber removes his receiver. In case no ringing signal had yet been allocated to the read subscriber, such signal could be allocated to him in the assumed case of operation. However, this may also happen in another case of operation, namely, in a case when the read subscriber whose address is contained in a cyclic storer for outgoing calls, has removed his receiver, and assuming that a device for receiving selection information is still allocated to him, and further assuming that a complete address is already contained on the same cycling phase in the cyclic storer for incoming calls. In such case, the device for receiving selection information is to be withdrawn from the read subscriber, and the subscriber whose address is contained in the cyclic storer for incoming calls, assuming that his line is idle, is to be connected with a ringing source. The execution of these operations assures that a called subscriber receives the ringing signal. The ringing source must also be disconnected when the called subscriber answers. This operating condition is present when the read subscriber has removed the receiver and when his address is contained in the cyclic storer U*b* for incoming calls, and when the corresponding subscriber is still connected with a ringing source. In such a case, the ringing source must be disconnected from the read subscriber.

It will be seen from the above described cases of operating conditions that control operations based upon comparison operations are to be effected only at some instances. Assuming that no control operation is to be effected, the address register can be stepped along directly after the corresponding comparison operation, and the next successive subscriber's station can thereupon be read. However, in case control operations are to be effected, the completion thereof must be awaited before the address register G is stepped further and carrying out the reading with respect to the next successive subscriber station. The corresponding control operations are advantageously effected while the next address cycling is carried out by the cyclic storer. If required for complicated control operations, the address cycling may be repeated several times. An address change-over is to be effected immediately thereafter.

The respective control operations are executed based upon control commands which are supplied by the control device E. To such control device are conducted the reading criteria delivered by the subscriber loops and also the signals resulting from the address comparison. The required control commands are obtained with the aid of a linking circuit contained in the control device E. The linking circuit may be constructed, for example, with the aid of And-gates and Or-gates as well as flip circuits serving as stores. The control commands are conducted to the involved operating devices, in the appropriate pulse phase, during the following address cycling. The control device is therefore connected with all these operating devices over suitable lines. In order to always permit consideration of the appropriate pulse phase, in the delivery of control commands, the control device contains timing members which are started, for example, at the instant at which is signalled an address coincidence, such timing members effecting the delivery of the respective control command after lapse of an interval required for the address cycling. Such a timing member is indicated in FIG. 1 at *t*.

The various devices described so far in connection with the communication system illustrated in FIG. 1, can be constructed in known manner. This is, for example, true with respect to the cycling storers since there are communication systems known in which such cycling storers are employed. The devices utilized as decoders are likewise known. The address register can be constructed with the aid of suitable and known counting chains. The comparison devices V*a* and V*b* can be constructed with the aid of suitable and known gates. Moreover, electronic switches are known which can be utilized, in the illustrated communication system, as call switches and also for other purposes. The communication system is also provided with other devices which have not been described, as indicated in FIG. 1 at R1 and R2. There is also to be provided, among others, a generator for supplying pulses, for example, the reading pulses P.

The examples shown in FIGS. 3 to 5, for the construction of the devices of the communication system, will now be described in detail.

Figures 3, 6:
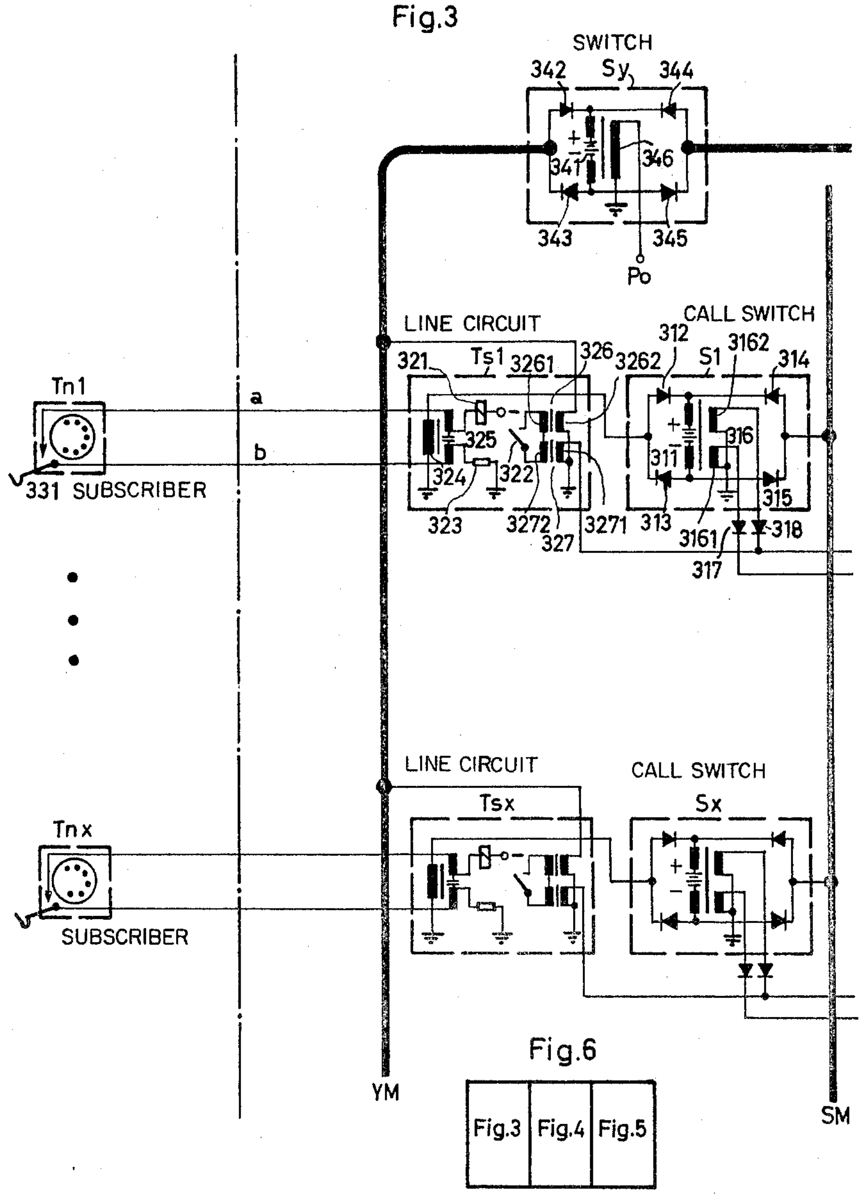
FIGS. 3 to 5 show examples for circuiting the devices employed.
FIG. 6 shows how FIGS. 3–5 should be assembled for reading the circuits.

The subscriber line circuits and switches shown in FIG. 3 will be considered first.

To the subscriber station T*n*1, including a hook switch with its cooperating contact 331, belong the line circuit T*s*1 and the call switch S1. The contact 331 will be closed upon removal of the receiver. The subscriber station T*s*1 is supplied with direct feed current over the relay 321 and the resistor 323, such current flowing to the subscriber station over the primary windings of the transformer 324 and the subscriber loop comprising the conductors *a* and *b*. Between the primary windings is disposed a capacitor 325 which interconnects these windings for alternating current flow while separating them for direct current flow. Accordingly, the alternating speech currents originating at the subscriber station can flow over the primary windings and in the secondary winding can appear alternating voltages and currents which are conducted over the call switch S1 to the speech multiplex point SM. Closure of the contact 331, responsive to removal of the receiver at the subscriber station T*n*1 causes current to flow over the relay 321 and such relay energizes. The subscriber line circuit T*s*1 also contains two transformers 326 and 327. The winding 3272 of the transformer 327 and the winding 3261 of the transformer 326 are connected with the make contact 322 of the relay 321. The winding 3262 of the transformer 326 is connected to ground and to the multiplex transmission line YM, and the winding 3271 of the transformer 327 is connected to ground and over the rectifier 328 with an output of the decoder D*a* (FIG. 4). So long as contact 322 is open, no current can flow over windings 3261 and 3272 of the transformers 326 and 327. Accordingly, a negative pulse delivered from the decoder D*a* over the rectifier 328 to the transformer 327, will not be transmitted to the transformer 326 and the winding 3262 thereof will in such case not deliver a pulse to the multiplex transmission line YM. However, when the contact 322 is closed, current will flow over the windings 3261 and 3272, and pulse conducted to the transformer 327 will be extended to the transformer 326. Accordingly, an impulse will appear in the winding 3262 of the transformer 326. This impulse is extended to the transmission multiplex line YM and serves as a criterion which indicates that the read subscriber T*n*1 has removed the receiver. In case no impulses is supplied from the subscriber line circuit T*s*1, it will serve as a criterion that the subcsriber T*n*1 has replaced the receiver.

The remaining subscriber line circuits, including the line circuit T*sx* are constructed exactly similarly as the line circuit T*s*1 and deliver in similar conditions in like manner impulses to the multiplex transmission line YM.

In the multiplex transmission line YM is inserted the switch S*y*. This switch is controlled by the control pulse P0. It comprises rectifiers 342 . . . 345 and a transformer 346. The voltage of the source 431 which is disposed in series with the secondary winding of the transformer 346 biases the rectifiers, in normal condition of the electron switch, in blocking direction. In this condition of the switch S*y*, no pulses can be extended from the multiplex transmission line YM to the central control device E, owing to the action of the diode rectifiers referred to which are inserted in the intermediate line portion. The control pulses P0 are conducted to the primary winding 346 of the transformer and produce pulses in the secondary windings. Assuming that the windings of the transformer extend in appropriate direction, the pulses appearing in the secondary winding will be of a polarity, such that the rectifiers will be biased in pass direction. Only if such pulses are present will pulses extended over the multiplex transmission line Y*m* be conducted to the central control device E.

The call switches Sl . . . S*x* are essentially constructed just like the switch S*y*. However, the primary windings of the respective transformers employed in the call switches S1 . . . S*x* are subdivided into two halves. The transformer 316 of the call switch S1 thus comprises the primary winding parts 3161 and 3162. This call switch is over its two primary winding parts connected with an output of the decoder D*a* and also with an output of the decoder D*b*. In the lead to the primary winding half 3161 is inserted a diode rectifier 317 (all rectifiers are diode rectifiers) which serves for decoupling purposes, just as the rectifier 318 inserted in the conductor extending to the primary winding half 3162. The operation of these rectifiers is such that, when a control pulse is extended from the decoder D*b* to the primary winding half 3161, the rectifier 317 will prevent such pulse to reach the decoder D*a*, where it would cause disturbances, and when a pulse is extended from the decoder D*a* to the primary winding half 3162, the rectifier 318 will be operative to prevent disturbances in the decoder D*b*.

The devices illustrated in FIG. 4 will be explained next.

Considering first the decoder D*a*, such decoder has seven output terminals 1D*a* . . . 7D*a* and, accordingly, seven call switches can be controlled thereby. The decoder itself is controlled over the pairs of input terminals 411, 412–421, 422 and 431, 432. Over these input terminals are supplied the addresses of the subscribers in the form of binary code symbols. Each binary code symbol consists of three symbol elements, one of which is always conducted to one pair of input terminals. A symbol element may thereby be represented either by the presence of ground potential on one terminal belonging to a terminal pair and negative potential on the respective other terminal, or the potentials may be interchanged. In the normal or resting condition, there will be ground potential on the input terminals 411, 421 and 431, and negative potential will be on the input terminals, 412, 422 and 432. This potential distribution corresponds to the binary code symbol 000. In case these potentials are interchanged at the three pairs of input terminals, it will correspond to the binary code symbol LLL, etc. Depending upon the binary code symbol which is conducted to the pairs of input terminals, one of the terminals 1D*a* . . . 7D*a* will be marked by the appearance of negative —U. None of the terminals 1D*a* . . . 7D*a* will be marked only when the binary code symbol 000 is extended.

The decoder D$a$ comprises a matrix provided with rectifiers. To the column lines (vertical) of this matrix is extended the potential —U over the resistors 433, 434, 435, etc. The row lines (horizontal) of the matrix are combined in pairs which are allocated to the respective input terminal pairs. Thus, the first row line pair is connected with the input terminal pair 411, 412, the second row line pair is connected with the input terminal pair 421, 422, and the third row line pair is connected with the input terminal pair 431, 432.

As already mentioned before, there is in normal condition ground potential on the terminals 411, 421, 431 and negative potential on the terminals 412, 422, 432. The column lines of the matrix are connected to the seven terminals 1D$a$ . . . 7D$a$. Rectifiers are provided with bridge crossing points of row lines and column lines, such rectifiers being distributed and polarized so that when the potentials are interchanged on at least one input terminal pair, negative potential will appear on one of the terminals 1D$a$ . . . 7D$a$. Ground potential was connected to these terminals before such interchange. When the binary code symbols are extended to the input terminal pairs, the potentials on at least one input terminal pair will be interchanged. Therefore, negative potential will appear on one of the terminals 1D$a$ . . . 7D$a$. There are a total of seven different binary code symbols.

As already stated, there is in the normal or resting condition ground potential on the terminals 411, 421 and 431. This ground potential is in the normal condition also operative at the terminals 1D$a$ . . . 7D$a$, being extended from the terminal 411 over the rectifier 481 to the terminal 1D$a$, from the terminal 421 over the rectifier 482 to the terminal 2D$a$, and over the rectifier 483 to the terminal 3D$a$. The ground potential is also extended from the terminal 431 over the rectifiers 484, 485, 486 and 487 to the terminals 4D$a$, 5D$a$, 6D$a$ and 7D$a$. When the potentials are now interchanged, for example, at the terminal pair 411, 412, the ground potential cannot be extended as before over the rectifier 481 to the terminal 1D$a$. The negative potential —U will instead become effective over the resistor 433 at the terminal 1D$a$. The ground potential is retained at the terminals 2D$a$ . . . 7D$a$ since it reaches these terminals as before by way of terminals 421 and 431. Negative potential will appear in corresponding manner at one of the terminals 2D$a$ . . . 7D$a$, responsive to the extension of one of the other binary code symbols.

The negative potential appearing at the terminals 1D$a$ . . . 7D$a$ is utilized for the control of the call switches. The decoder described herein can control seven call switches. The use of a more elaborate matrix with an increased number of rectifiers will permit construction of a decoder for controlling a considerably greater number of call switches.

The decoder D$a$ is also provided with an output OD$a$ which has not been mentioned before. This output is over resistor 436 placed on the negative potential —U and connected to the terminals 412, 422, 432 over the rectifiers 488, 489, 490, respectively. The result is, that, when the binary code symbol 000 is supplied, the negative potential —U will be effective only at the output OD$a$. However, when another binary code symbol is supplied to the decoder D$a$, the ground potential then connected to at least one of the input terminals 412, 422, 432, will become effective at the output terminal OD$a$. The binary code symbol 000 is not utilized as an address. Accordingly, what is signalled at the output terminal OD$a$, is whether or not an address has been supplied to the decoder.

Next to be described is the cyclic storer U$a$ which delivers the addresses to be supplied to the decoder D$a$. The cyclic storer U$a$ contains similarly constructed timing members to which are conducted pulses for the periodic cycling. One of these timing members, namely the timing member U$a$1, is shown in detail in FIG. 4. It contains a wire 451 of a length such, that when an impulse is supplied magnetostrictive at one end, it will reach the other end at the time-spacing of two control pulses. The wire is fastened at its opposite ends by suitable means 453 and 454, such that no impulse reactions occur thereat. Impulses can be supplied to the wire 451 by means of the coil 452. When a current surge is passed through this coil, there will be produced a magnetic field which is effective to shorten or to extend the wire in the longitudinal direction thereof. This alteration in length is equivalent to an impulse passing through the wire in longitudinal direction. The wire is made of ferroelectric material, for example, of nickel. One end of the coil 452 is on ground potential over the collector-emitter path of the pnp-transistor 455 and the other end of the coil is placed on the potential —U over the resistor 457 and the collector-emitter path of the npn-transistor 456. The base of the transistor 456 is over a resistor 458 on ground potential, and this transistor is accordingly, normally conductive. The base of the transistor 455 is over the resistor 460 on the positive potential +U$v$ and this transistor is accordingly normally blocked. The base of this transistor is moreover over the resistor 459 connected to the terminal 411. When a negative impulse appears at this terminal, the transistor 455 will temporarily become conductive and the coil 452 will be traversed by a current surge, thereby supplying an impulse for the wire 451. The resistor 457 serves for limiting the current.

Negative impulses can appear on the terminal 411 for two different reasons. Such impulses can first of all be produced by means of the transistor 461. The emitter of this transistor is connected to the terminal 411. Its collector is on the potential —U and its base is on ground potential. Accordingly, this transistor is in normal condition blocked. This transistor becomes temporarily conductive responsive to a negative impulse conducted to the base thereof from the terminal E$a$1 over the resistor 463, and a negative impulse will accordingly appear at the terminal 411, causing an impulse to traverse the wire 451. Impulses can be correspondingly supplied from the terminals E$a$2 and E$a$3 to the timing members U$a$2 and U$a$3. Accordingly, the terminals E$a$1, E$a$2 and E$a$3 represent inputs of the cyclic storer U$a$, over which addresses are supplied for cycling therein.

There will now be described the second possibility for the appearance of negative impulses at the terminal 411. At the end of the wire 451 is a coil 464. When an impulse supplied to the wire traverses this coil, a voltage surge will be induced therein. To this coil is connected the base of the transistor 466. The resistors 467 and 468, connected between ground potential and the negative potential —U are operative to place on the base of the transistor 466 a potential which makes it conductive in the normal or resting condition. The coil 464 is wound in a sense such that a positive pulse is supplied to the base, so that the transistor 466 will be temporarily blocked. The collector of the transistor 466 is over the resistor 430 on the negative potential —U. The emitter of this transistor is on ground potential. To the collector is also connected the terminal 411. In the normal or resting condition of the transistor, that is, when such transistor is conducting, there is on this terminal 411, ground potential. However, when the transistor is blocked, the negative potential —U will be operative over the resistor 470 with respect to the terminal 411. This will be the case when an impulse previously supplied to the wire 451 traverses the coil 464. Accordingly, this impulse is in this instant again supplied, by the cooperation of the transistor 466 and 455, to the wire 451 and is periodically cycled therein.

An address which is being cycled in the cyclic storer may comprise more than one impulse. Each of these impulses is periodically cycled in another timing member. There impulses are supplied to the timing members with identical cycling phase. It must now be ensured that they continue to be cycled with the same cycling phase. There is for this purpose provided a synchronizing device comprising an impulse generator Pz which is connected with the terminals 411, 421 and 431, each connection including a rectifier such as 471 which is inserted in the conductor extending to the terminal 411. The impulse generator supplies negative pulses which are spaced apart corresponding to the spacing of the pulses running successively through the timing member. The internal impedance of the pulse generator Pz is very low. Accordingly, during the pauses between the pulses, the terminal 411 will be on ground potential over the circuit including the rectifier 471 and the low internal impedance of the generator Pz. A negative impulse can appear at the terminal 411 only when the transistor 466 is blocked and when the pulse generator Pz delivers at such instant a negative pulse. The negative potential —U on the resistor 470 cannot become operative at the terminal 411 when the transistor 466 is blocked, since such terminal is on ground potential over the rectifier 471 and the very low internal impedance of the impulse generator Pz. In case a negative pulse is supplied only from the pulse generator Pz, the rectifier 471 will act in blocking direction, and such negative pulse cannot become operative at the terminal 411.

The addresses cycling in the cyclic storers can also be cancelled, employing for this purpose, in case of the timing member U*a*1, the transistor 456 which is in normal or resting condition conductive, and which is blocked responsive to supplying to the terminal L*a*1 a sufficiently negative pulse. A pulse to be at that instant written (impressed) on the wire 451 is thereby suppressed and thereafter cancelled. Impulses which are being cycled in the cyclic storers or timing members U*a*2 and U*a*3 are cancelled in similar manner.

The foregoing explanations are concerned with the supply of potentials to the terminals 411, 421 and 431. Suitable potentials must however also be supplied to the terminals 412, 422 and 432. The terminal 412 shall be considered first. In normal or resting condition, there will be at the terminal 412 the potential —U which is extended over the resistor 473. Upon appearance of negative potential on the terminal 411, the transistor 472, which until then was blocked, will become conductive over the resistor 474. The collector of this transistor is connected to the terminal 412 and its emitter is on ground potential. Accordingly, when the transistor 472 becomes conductive, ground potential will be extended to the terminal 412. Therefore, either negative potential or ground potential will be on this terminal 412. It follows, therefore, that the required interchange of the potentials on the terminals 411 and 412 will be effected when such interchange is needed. The circuit comprising the transistor 472 serves as an inverter. The terminals 422 and 432 are supplied with potentials in a similar manner as described in connection with terminal 412.

The addresses which are being cycled in the cyclic storer U*a* must be delivered not only to the decoder D*a*, but also to other devices, such as to the comparison device V*a*. These devices are conneced to the output terminals A*a*1, A*a*11, A*a*2, A*a*21, A*a*3 and A*a*31, which are in turn connected with the terminal pairs 411–412, 421–422 and 431–432.

Figure 4:
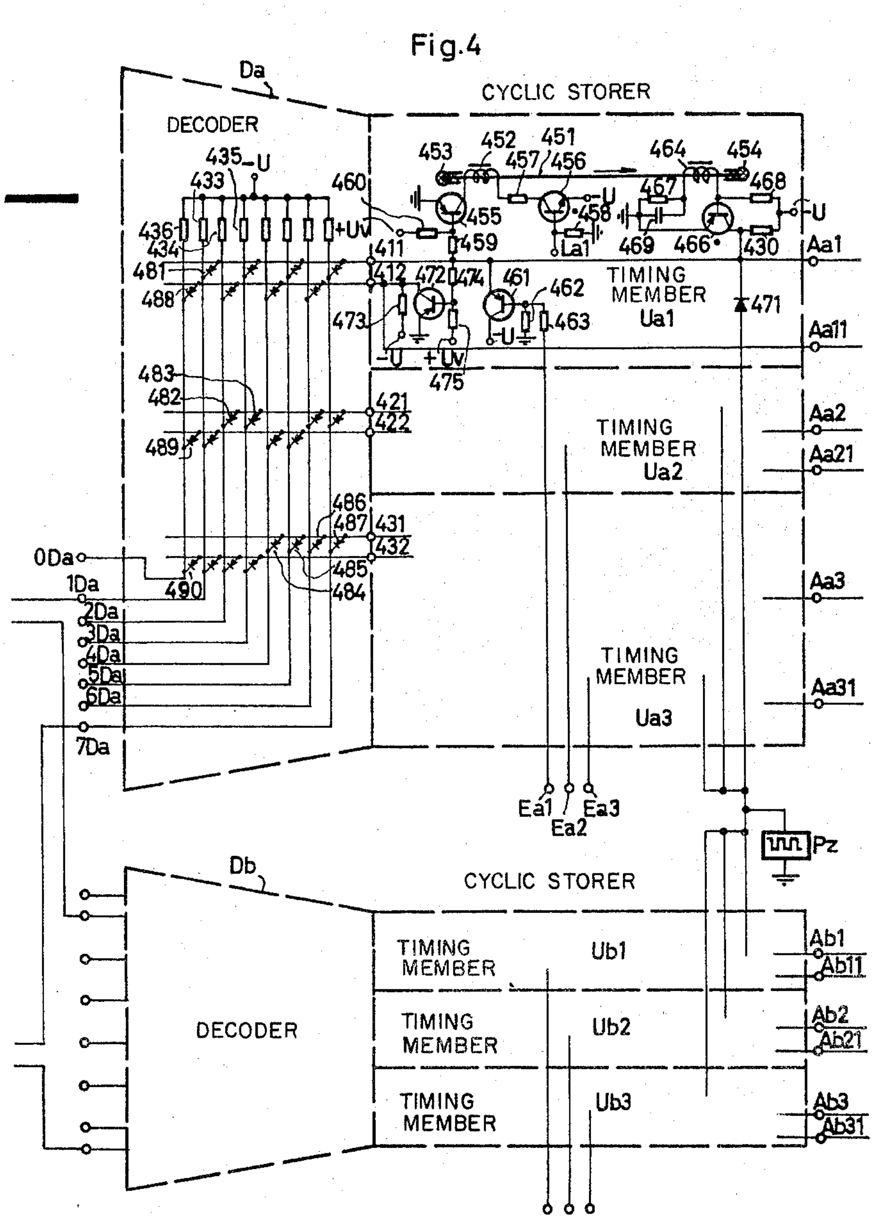
Figure 5:
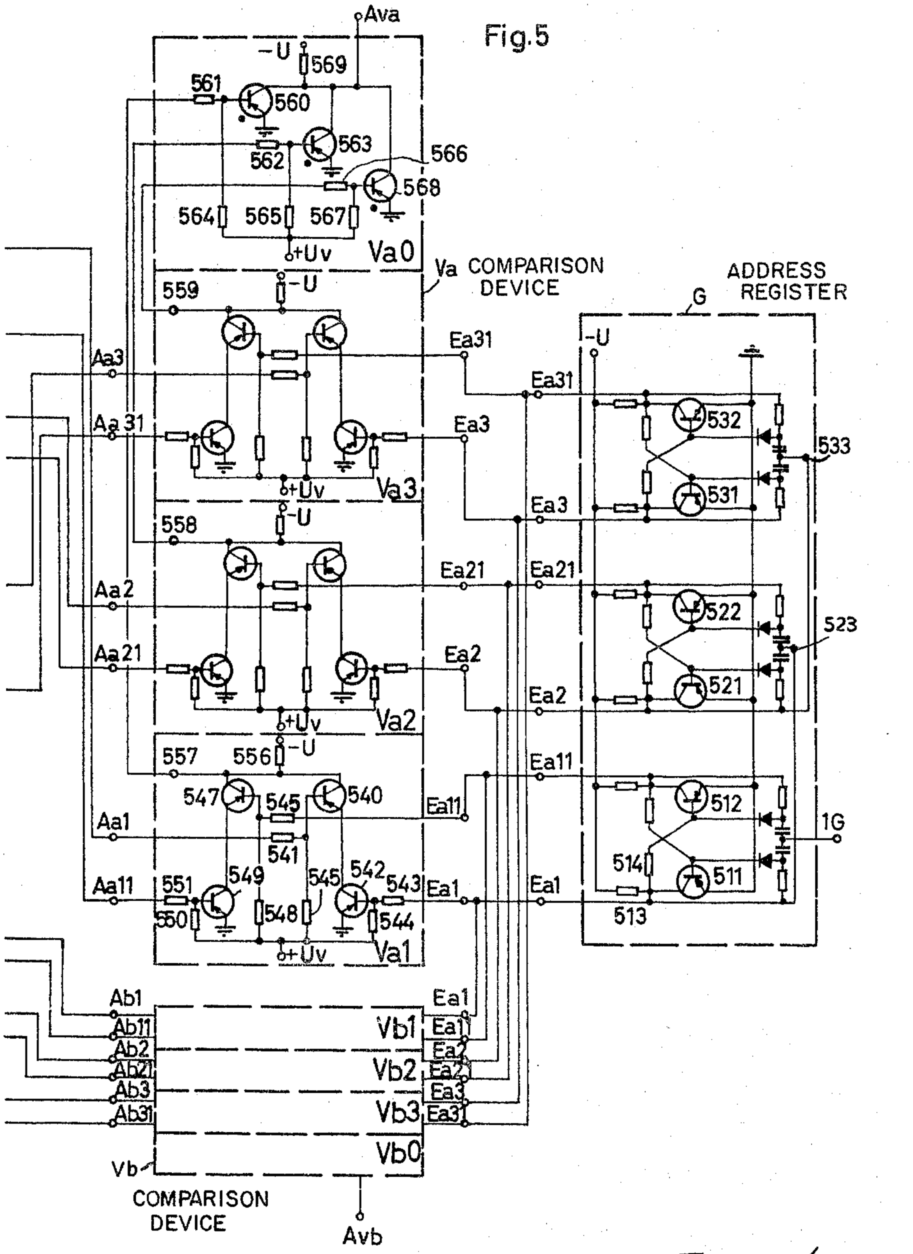

In addition to the above described decoder D*a* and its cyclic storer U*a*, FIG. 4 also indicates in schematic manner the decoder D*b* and the cyclic storer U*b* with its timing members U*b*1–U*b*2 and U*b*3. The decoder D*b* is constructed exactly as the decoder D*a* and the cyclic storer U*b* exactly as the cyclic storer U*a*. To the output terminals A*b*1, A*b*2 and A*b*3 of the cyclic storer U*b* is connected the comparison device V*b* and to the output terminals A*a*1, A*a*2, A*a*3, etc., is in similar manner connected to the comparison device V*a* shown in FIG. 5. The addresses which are to be compared are delivered to these comparison devices by means of the cyclic storers U*a* and U*b* as well as by means of the address register G, the latter being also shown in FIG. 5.

The construction of the address register G (FIG. 5) shall be described next.

The address register comprises three bistable flip circuits, each having two transistors. Transistors 511, 512 belong to the first flip circuit; transistors 521, 522 beyond to the second flip circuit; and transistors 531, 532, belong to the third flip circuit. These flip circuits are constructed in known manner. Each can assume two different operating positions in which one or the other transistor is conductive. The collectors of these transistors are connected to the respective terminal pairs E*a*1–E*a*11, E*a*2–E*a*21 and E*a*3–E*a*31, from which the addresses are delivered. The three flip circuits are circuited in a binary counting chain. The terminal 1G represents the count input which is connected over rectifier gates with the bases of the transistors 511, 512. The transistors 511, 521 and 531 are, in the normal condition of the address register, conductive, and ground potential is therefore on the terminals E*a*1, E*a*2 and E*a*3, since the collectors of the respective transistors are likewise on ground potential over their collector-emitter paths. Negative potential is at the same time on the collectors of the transistors 512, 522 and 532, such transistors being blocked by the action of the negative potential —U on the collectors thereof. Accordingly, the negative potential —U is also on the terminals E*a*11, E*a*21 and E*a*31.

A positive pulse supplied to the count input 1G will be extended to the base of the transistor 511, thereby blocking such transistor. The transistor will at the same time become conductive in known manner, since its collector potential will become more negative responsive to the blocking of the transistor 511. This condition is operative, over the resistor 514, with respect to the base of the transistor 512. On the terminal E*a*1 is now negative potential —U from the collector resistor 513 of the transistor 511. Since the transistor 512 is now conductive, ground potential will be on the terminal E*a*11. The potential conditions previously prevailing on the terminals E*a*1 and E*a*11, have accordingly been changed.

Upon conducting a further positive pulse to the count input 1G, the transistor 512 will be blocked and the transistor 511 will become conductive again. Its collector potential becomes more positive since there is again ground potential on the collector instead of negative potential. The collector of the transistor 511 is connected with the terminal 523 of the second bistable flip circuit comprising the transistors 521 and 522. To this terminal will be conducted a positive potential surge when the transistor 511 becomes conductive again. As a consequence, the transistor 521 will be blocked in the same manner as the transistor 511 had been blocked before. This flip circuit is thus likewise controlled incident to the counting operation of the counting chain representing the address register G.

The collector of the transistor 521 is now also connected with the terminal 533 of the third flip circuit comprising the transistor 531 and 532, thus providing for the control of this flip circuit in the course of the further counting operation.

Accordingly, at the terminal pairs E*a*1–E*a*11, E*a*2–E*a*21 and E*a*3–E*a*31, will appear, in the course of the counting, different three-place binary symbols. These terminals are connected with similarly referenced terminals of the comparison devices V*a* and V*b*, and these binary code symbols are therefore extended to the corresponding comparison devices.

The comparison device V*a* (parts V*a*1, V*a*2, V*a*3 and V*a*0 in FIG. 5) will be explained next.

As explained before, three-place binary code symbols are extended to the comparison device respectively from the cyclic storer U*a* (timing members U*a*1, U*a*2, U*a*3 in FIG. 4) and from the address register G (FIG. 5), that is, symbols which consist of three symbol elements. Each symbol element is represented by predetermined potentials, namely, ground potential and negative potential. The appearance of these potentials at the terminal pairs of the address register G has already been described. These potentials appear likewise on the output terminals A*a*1, A*a*21, A*a*2, A*a*21, A*a*3 and A*a*31, as well as on the output terminals A*b*1, A*b*11, A*b*2, A*b*21, A*b*3 and A*b*31, of the cyclic storers U*a* and U*b*, since they are interconnected with the respective terminal pairs of the cyclic storers.

The mutually corresponding symbol elements of the two delivered binary code symbols are first examined in the comparison device V*a* as to the identity thereof; the comparison circuit V*a*1 serving for the comparison of the first two symbol elements, the circuit V*a*2 serving for the comparison of the second two symbol elements, and the comparison circuit V*a*3 serving for the comparison of the third two elements. The three comparison circuits are constructed similarly.

The comparison circuit V*a*1 comprises two And-gates with a common output represented by the terminal 557. The first And-gate comprises the transistors 540 and 542, the emitter-collector paths of these two transistors being connected in series. The emitter of the transistor 542 is on ground potential and the collector of the transistor 540 is on negative potential —U over the resistor 556. The bases of these two transistors are on positive +U*v* potential over the resistors 544 and 545, such potential being operative to maintain the transistors for the time being in blocked condition. The base of the transistor 540 is also connected, over the resistor 541, to the output terminal A*a*1 of the cyclic storer U*a* (timing member U*a*1 in FIG. 4). The base of the transistor 542 is connected, over the resistor 543, with the terminal E*a*1 of the address register G.

Assuming that the first places of the binary code symbols conducted to the comparison device V*a* correspond to the symbol element L, there will appear negative potential on the output terminal A*a*1 and also on the terminal E*a*1. The bases of the transistors 540 and 542 will then become more negative than before, in fact, so negative, that these transistors become conductive. Ground potential will be on the collector of the transistor 540 and therewith on the terminal 557, over the collector-emitter paths of the transistors 540 and 542, thus indicating the identity of the symbol elements.

This ground potential must also appear on the terminal 557 when the first places of the two delivered binary code symbols signify the symbol element O. This is obtained by the action of the And-gate, comprising the transistors 547 and 549 which are, just as the transistors 540 and 542, connected in series, and which are in normal condition blocked by the action of the positive potential +U*v* which is connected thereto over the resistors 548 and 550. The collector of the transistor 547 is connected to the terminal 557. The base of the transistor 549 is connected to the output terminal A*a*1 over the resistor 551. When there is negative potential on the terminal A*a*1, there will be positive potential on the output terminal A*a*11, and vice versa. Accordingly, when the timing member U*a*1 delivers the symbol element O, there will be negative potential on the output terminal A*a*11. This potential becomes over the resistor 551 operative with respect to the base of the transistor 549 and this transistor becomes conductive.

Assuming that the first place of the binary code symbol delivered simultaneously by the address register G signifies a symbol element corresponding to 0, the transistor 547 will also have to be conductive so that the terminal 557 is placed on ground potential over the emitter collector paths of the transistors 547 and 549, to indicate identity of the respective symbol elements. The base of the transistor 547 is therefore connected over the resistor 545 with the terminal E*a*11 of the address register G. At this terminal is negative potential, when ground potential is on the terminal E*a*1, that is, when the first place of the binary code symbol delivered by the address register G corresponds to O as a symbol element.

It will be seen from the foregoing explanations that the identity of the respective symbol elements is, due to the action of the two And-gates belonging to the comparison circuit V*a*1, in any case indicated by the appearance of ground potential on the terminal 557. However, in case two different symbol elements are delivered to the comparison circuit V*a*1, the potential —U will appear at the terminal 557.

If the binary code symbols or addresses delivered to the comparison device are identical, the symbol elements delivered to the three comparison circuits V*a*1, V*a*2, V*a*3 will of necessity be also mutually identical. The identity of the symbol elements is signalled by the appearance of ground potential at the terminals 557, 558 and 559 of the comparison circuits V*a*1, V*a*2 and V*a*3, respectively. These individual signalling results must now be combined.

There is for this purpose provided a circuit V*a*0 (top of FIG. 5) which constitutes an And-gate, comprising the transistors 560, 563 and 568. These transistors have a common collector resistor 569, the free end of which is connected to the potential —U. The emitters of these transistors are on ground potential and the bases thereof are on positive potential +U*v* over the resistors 564, 565, and 567, respectively. These transistors are blocked when this potential is only on the bases thereof. In case that identity of symbol elements is not signalled by the comparison circuits V*a*1, V*a*2 and V*a*3, there will be negative potential on the terminals 557, 558 and 559. This negative potential will be operative, over the resistors 561, 562 and 566, with respect to the bases of the transistors 560, 563 and 568, causing these transistors to become conductive. Accordingly, there will be in such case ground potential on the output terminal A*va*, such terminal being connected to the collectors of the transistors 560, 563, 568 and the ground potential being delivered to the terminal A*va* over the collector-emitter paths of these transistors.

This ground potential remains on the output terminal A*va* so long as at least one of these transistors is conductive. At least one of these transistors is conductive when there is negative potential on at least one of the terminals 557, 558, 559, that is, when the symbol elements are different at least at one point of the binary code signals, in other words, when the binary code symbols as such are different. The three transistors 560, 563 and 568 are simultaneously blocked only when the binary code symbols are identical, because there will simultaneously be, instead of negative potential, ground potential on the three terminals 557, 558, 559. The bases of the transistors 560, 563, 568 will in such case not be affected by the negative potential. The transistors will thus be blocked and the negative potential —U will be operative at the output terminal A*va*, thereby indicating that the binary code symbols or addresses conducted to the comparison device V*a* are identical.

The components of the comparison device V*b*, that is, the three comparison circuits V*b*1, V*b*2, V*b*3 and the And-gate V*b*0 (FIG. 5), are constructed just like the corresponding components of the comparison device V*a*, and are respectively connected to the output terminals A*b*1, A*b*11–A*b*2, A*b*21 and A*b*3, A*b*31 of the cyclic storer U*b*, comprising the timing members U*b*1, U*b*2, U*b*3 (FIG. 4) and to the terminals E*a*1, E*a*11–E*a*2, E*a*21 and E*a*3, E*a*31 of the address register G. Ground potential will be on the output terminal A*vb* when the delivery binary code symbols are different, while negative potential will be on such output terminal when the delivery binary code symbols are identical.

Changes may be made within the scope and spirit of the appended claims which define what is believed to be new and desired to have protected by Letters Patent.

We claim:

1. A communication system, especially a telephone system, wherein two-wire connections are established between subscriber stations in accordance with the time multiplex principle, comprising line circuits respectively cooperatively connected with subscriber stations, means forming a call multiplex point, electronic call switches for connecting with said call multiplex point, over the respective line circuits, subscriber stations which are to be interconnected, means for producing, under the control of addresses of subscribers involved in the extension of a call, phase shifted control pulses for controlling the operative actuation of said electronic call switches, the respective phase shifted pulses being cyclically allocated to the connection which is to be established between the involved subscriber stations, a common control device, means for inserting in the cycle of said control pulses a reading pulse with a pulse sequence frequency corresponding to that of the control pulses, means governed by said reading pulse for successively testing all line circuits as to the busy or idle condition of the respective subscriber stations and thereby producing in the line circuits a corresponding criterion, means for directly extending criteria to said common control device, and means in said common control device for evaluating a received criterion after comparison of the address of the corresponding tested subscriber station with the addresses of subscriber stations which are involved in extended calls.

2. A communication system according to claim 1, comprising a supervising multiplex line, and means for extending said criteria to said common control device over said supervising multiplex line.

3. A communication system according to claim 2, comprising identical devices for distributing to the various subscribers the reading pulses and the control pulses.

4. A communication system according to claim 3, wherein the criterion, which is responsive to the reading of a subscriber line circuit extended to said supervising multiplex line is in the from of an impulse or lack of an impulse depending upon the operating condition of the respective line circuit.

5. A communication system according to claim 1, comprising cyclic storers containing subscriber addresses and decoding means for the evaluation of the addresses, for extending said control pulses to the call switches of the involved subscribers, and means for cyclically successively conducting to a decoder during the reading pulses the addresses of all subscribers.

6. A communication system according to claim 5, wherein the pulses delivered by the respective decoder are supplied to the call switches and also to the subscriber line circuits which are to be tested .

7. A communication system according to claim 6, wherein the evaluation involves solely the criteria delivered during the reading pulse by the subscriber line circuits.

8. A communication system according to claim 7, comprising a switch included in said supervising multiplex line, said switch being controlled by the reading pulse to cause switching through of said line only synchronously with said pulse.

9. A communication system according to claim 8, comprising an address register for supplying the subscriber addresses, the address of a subscriber involved remaining in said register until conclusion of the control operations required for such subscriber in accordance with the operating condition of the respective subscriber line.

10. A communication system according to claim 9, comprising a counting chain circuit forming part of said register, the momentary setting of said chain representing an address, and means for stepping said chain along by one count position to effect delivery of the next address.

11. A communication system according to claim 10, comprising two cyclic storers provided respectively for the addresses of subscribers involved in incoming and outgoing calls, and means for effecting the comparison between the address of the subscriber line circuit which is being tested by a reading pulse and the addresses entered in the two cyclic storers, during one cycling of the addresses in said cyclic storers.

12. A communication system according to claim 11, wherein control operations are omitted with respect to a tested subscriber whose receiver had been replaced and whose address is not entered in any of the cyclic storers.

13. A communication system according to claim 11, comprising means for entering the address of a subscriber, whose address does not appear in any of the cyclic storers but who has removed his receiver, in the cyclic storer for outgoing calls, with a pulse phase not yet assigned to a connection, and means for allotting to such subscriber a device for receiving selection information therefrom.

14. A communication system according to claim 13, wherein control operations are omitted upon ascertaining incident to comparison that a subscriber tested by a reading pulse has removed his receiver and that his address is contained in the cyclic storer for outgoing calls while not being contained with the same pulse phase in the cyclic storer for incoming calls.

15. A communication system according to claim 11, comprising means operative responsive to ascertaining that a tested subscriber has replaced the receiver with his address contained in the cyclic storer for outgoing calls, for cancelling such address in the respective cyclic storer and simultaneously also cancelling the address contained with the same pulse phase in the cyclic storer for incoming calls, thereby effecting release of the connection belonging to said addresses.

16. A communication system according to claim 11, wherein control operations are responsive to comparison omitted upon ascertaining that the tested subscriber has replaced the receiver and that his address is contained in the cyclic storer for incoming calls.

17. A communication system according to claim 11, comprising means operative upon ascertaining that the tested subscriber has removed the receiver and that his address is contained in the cyclic storer for outgoing calls and further that a device for receiving selection information is alloted to him and that a complete address is contained in the cyclic storer for incoming calls, for withdrawing from the tested subscriber the device for receiving selection information and for connecting a ringing signal source to the subscriber for incoming calls if the latter subscriber is found to be idle.

18. A communication system according to claim 11, comprising means operative upon ascertaining that the tested subscriber has removed his receiver and that his address is contained in the cyclic storer for incoming calls and further, that a ringing signal source is connected to such subscriber, for disconnecting such source from the tested subscriber line.

19. A communication system according to claim 12, comprising means effective upon conclusion of the comparison operation for testing the next following subscriber.

20. A communication system according to claim 13, comprising means effective responsive to release and conclusion of the control operations for testing the next following subscriber.

21. A communication system according to claim 15, wherein the respective control operations are effected during the cycling of the addresses taking respectively place after the cycling of said cyclic storers.

22. A communication system according to claim 21, comprising means for effecting the change of the subscriber address in the address register directly after subsequent cycling thereof.

23. A communication system according to claim 3 comprising means for conducting to the common control device in addition to the reading criteria also the signals resulting from the address comparison, linking means in said control device for thereupon obtaining the respective control commands, and means for thereafter conducting said control commands, with the proper pulse phase and during the next following address cycling, to the appropriate connection devices.

References Cited by the Examiner

UNITED STATES PATENTS

| | | | |
|---|---|---|---|
| 2,917,583 | 12/1959 | Burton | 179—15 |
| 2,935,569 | 5/1960 | Saal et al. | 179—15 |
| 3,015,699 | 1/1962 | Faulkner et al. | 179—15 |

DAVID G. REDINBAUGH, *Primary Examiner.*

ROBERT H. ROSE, *Examiner.*

J. W. SAUNDERS, T. G. KEOUGH, R. L. GRIFFIN, *Assistant Examiners.*